(12) United States Patent
Wendling et al.

(10) Patent No.: US 8,383,255 B2
(45) Date of Patent: Feb. 26, 2013

(54) CLOSURE ASSEMBLY FOR ELECTROCHEMICAL CELLS

(75) Inventors: Matthew T Wendling, Avon, OH (US); Mark A Schubert, Medina, OH (US); James X Wu, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 648 days.

(21) Appl. No.: 12/391,795

(22) Filed: Feb. 24, 2009

(65) Prior Publication Data

US 2010/0215996 A1     Aug. 26, 2010

(51) Int. Cl.
*H01M 2/12* (2006.01)
(52) U.S. Cl. .......................................... 429/53
(58) Field of Classification Search ................ 429/231.5
See application file for complete search history.

(56) References Cited

U.S. PATENT DOCUMENTS

| | | | |
|---|---|---|---|
| 5,290,414 | A | 3/1994 | Marple |
| 5,376,467 | A | 12/1994 | Abe et al. |
| 5,609,972 | A | 3/1997 | Kaschmitter et al. |
| 5,766,790 | A | 6/1998 | Kameishi et al. |
| 5,853,912 | A | 12/1998 | Naing et al. |
| 5,876,868 | A | 3/1999 | Tanida |
| 6,531,242 | B1 | 3/2003 | Sugimoto et al. |
| 6,620,544 | B1 | 9/2003 | Shin et al. |
| 6,849,360 | B2 | 2/2005 | Marple |
| 2005/0026033 | A1 | 2/2005 | Kawano et al. |
| 2005/0079404 | A1 | 4/2005 | Schubert et al. |
| 2005/0079413 | A1 | 4/2005 | Schubert |
| 2005/0112462 | A1 | 5/2005 | Marple |
| 2005/0244706 | A1* | 11/2005 | Wu et al. .......................... 429/56 |
| 2006/0078787 | A1* | 4/2006 | Sato et al. ........................ 429/62 |
| 2006/0093904 | A1 | 5/2006 | Cheon et al. |
| 2006/0115725 | A1 | 6/2006 | Kim |
| 2006/0228620 | A1 | 10/2006 | Martinson et al. |
| 2007/0015046 | A1 | 1/2007 | Kim et al. |
| 2007/0154781 | A1 | 7/2007 | Choi |
| 2008/0026288 | A1 | 1/2008 | Marple et al. |
| 2008/0026293 | A1* | 1/2008 | Marple et al. ............ 429/231.95 |

(Continued)

FOREIGN PATENT DOCUMENTS

| | | |
|---|---|---|
| EP | 0739047 A2 | 10/1996 |
| JP | 05-151944 A | 6/1993 |

(Continued)

OTHER PUBLICATIONS

Patent Cooperation Treaty (PCT), International Search Report and Written Opinion for Application No. PCT/US2010/022158, filed Jan. 27, 2010, mailed Jul. 27, 2010, Korean Intellectual Property Office, Republic of Korea.

(Continued)

*Primary Examiner* — Ula C Ruddock
*Assistant Examiner* — Daniel Gatewood
(74) *Attorney, Agent, or Firm* — Robert C. Baraona

(57) ABSTRACT

An end assembly seals a cylindrical electrochemical cell. The assembly includes a positive temperature coefficient (PTC) device and a gasket having a protrusion that cooperates with the end assembly isolates the PTC device from primary axial compression forces present in the closure assembly. In further embodiments of the present invention, the end assembly may be produced by insert molding a seal element about the terminal cover and the gasket itself has an E or F shaped cross section.

18 Claims, 4 Drawing Sheets

U.S. PATENT DOCUMENTS

| | | |
|---|---|---|
| 2008/0213651 A1 | 9/2008 | Wu et al. |
| 2009/0104520 A1 | 4/2009 | Marple |
| 2009/0311583 A1 | 12/2009 | Wu |

FOREIGN PATENT DOCUMENTS

| | | |
|---|---|---|
| JP | 10-162805 A | 6/1998 |
| JP | 11-260334 A | 9/1999 |
| JP | 11-283588 A | 10/1999 |
| JP | 2001-160382 A | 6/2001 |
| JP | 2006-216358 A | 8/2006 |
| JP | 2007-157609 A | 6/2007 |
| WO | 2008013853 A2 | 1/2008 |

OTHER PUBLICATIONS

Patent Cooperation Treaty (PCT), International Search Report and Written Opinion for Application No. PCT/US2010/022160, filed Jan. 17, 2010, mailed Jun. 16, 2010, European Patent Office, Netherlands.

U.S. Appl. No. 12/136,910.

U.S. Appl. No. 12/253,516.

* cited by examiner

CLOSURE ASSEMBLY FOR ELECTROCHEMICAL CELLS

FIELD OF THE INVENTION

The present invention relates to a closure assembly for an electrochemical cell. More particularly, a primary lithium-containing electrochemical cell is disclosed. The cell has a closure assembly comprising a cover, a sealing gasket with a shelf disposed along its axial middle portion and a positive temperature coefficient (PTC) device, wherein the arrangement of the closure isolates the PTC from primary axial compression forces. A preformed seal assembly produced by insert molding the gasket around the cover.

BACKGROUND OF THE INVENTION

A related patent application, also entitled "Closure Assembly for Electrochemical Cells" and having U.S. patent application Ser. No. 12/391,742, was filed on the same day as this application and is hereby incorporated by reference.

Electrochemical cells, including but not limited to those with a lithium metal or alloy as an electrochemically active material, often utilize one or more positive temperature coefficient ("PTC") safety devices. These devices limit the current that can flow through the cell in order under certain conditions. For example, excess heat sufficient to activate the PTC device may be generated in an electrochemical cell as a result of external short circuit, attempting to recharge a primary cell, improperly charging a rechargeable cell, forced overdischarge, or improper installation of cells in a device.

Typically, PTC devices include a layer comprising a polymer and conductive particles such as carbon. When the temperature of the PTC device is increased above an activating temperature, the polymer thermally expands in a way that electrically disconnects the conductive particles dispersed within the PTC, thereby cutting off the flow of current through the PTC device. Consequently, electrochemical cell designs must allow for the thermal expansion of the PTC device.

Cylindrical electrochemical cells, such as AA and AAA sized batteries, are formed by a can (i.e., a cylinder with a closed bottom) and a cover and have an overall can height that is larger than the can's diameter. The electrical terminals of the battery are integrally formed on the bottom of the can and the cover. The container (i.e., the combination of the can and the cover) is then sealed by compressing a gasket or seal member between the cover and a portion of the open end of the can. In order to insure a hermetic seal, the compressive force should be maintained in both the axial and radial directions of the cylinder, usually by beading the can's sidewalls and then crimping the edge of the open end of the can over the cover. Insofar as the PTC device is often connected to the cover, this closure may subject the PTC device to compressive axial forces that adversely affect the activation of the PTC.

A common closure used in commercially available lithium-iron disulfide cells is shown in FIG. 7. Electrochemical cell 1 includes a cover 2 and PTC device 4 configured at a terminal end of the cell. Gasket 6 has an axial middle portion with a substantially uniform shape. The cover 2, PTC device 4 and contact assembly 8 (which includes both a rollback cover and a spring) are held, housed, or retained within the C-shaped gasket 6. Notably, axial force must be exerted to crimp the terminal edge of the can 3 during the sealing of the cell, thereby exposing the PTC device 4 to axial compressive forces during the closing operation itself. Moreover, because the crimped edge remains in place and the elastomeric gasket remains axially compressed, it will continue to axially constrict activation of the PTC (which requires the axial expansion of the PTC) throughout the life of the battery.

Various approaches have attempted to allow the PTC device to remove the PTC device from unwanted axially compression, thereby allowing it to expand upon activation. One such approach contemplates the use of additional conductive members, and/or spring-like devices, although this requires a substantial reconfiguration (and reduction in size) of the PTC device. Gasket materials that softens at a temperature below the activation of the PTC device have also been used, but this may eliminate the use of the best performing materials. Yet another approach is to locate the PTC outside of the container, but this requires a means for attaching the PTC to the can/cover and increases the likelihood of damage to the PTC.

U.S. Pat. No. 6,090,322 relates to a method for integrally insert-molding a C-shaped gasket onto a peripheral edge of a metal sealing plate in a coin cell. U.S. Pat. No. 6,274,267 describes insert-molding a question-marked shaped gasket around a cylindrical cell cover plate. In some embodiments of this latter patent, a PTC device is located between a bead and a crimped portion of the open end of the container, adjacent one or more of a terminal cover; however, this arrangement subjects the PTC device to compressive axial forces during sealing of the cell.

U.S. Pat. No. 5,376,467 describes an organic electrolyte battery having a positive temperature coefficient resistor. In one embodiment, the PTC resistor is carried on a conductive annular member so that the PTC resistor is spaced radially inward, away from a crimping zone. In a second embodiment, it is disposed in the center of the lid and connected to the sealing member by a support member. In both instances, these arrangements necessarily require welding or adhesively fixing the PTC resistor to an additional conductive sealing member and the PTC resistor must have a diameter that is substantially smaller than the inner diameter of the battery can, thereby limiting the amount of surface area and overall effectiveness of the PCT resistor.

U.S. Pat. No. 5,766,790 relates to a safety device for use in a secondary battery that relies upon a series of disk-shaped springs. Internal pressure from the battery housing deforms the springs so as to break the electrical contact between the external terminal and one of the disk-shaped springs. Notably, this device requires numerous moving parts and relies solely on the internal pressure within the cell caused by overheating the electrolyte, rather than being activated by the electrical demands (i.e., the load) placed on the cell.

U.S. Pat. No. 6,531,242 and Japanese Publication No. 05-151944 disclose the use of multiple gaskets in a battery seal. These gaskets work together to minimize the compressive forces exerted on the PTC device. In the former, a series of nested gaskets cooperate in conjunction with a lead plate and the PTC device. In the later, two separate gaskets are provided, with the gasket that comes into contact with the PTC device having a lower melting point than the activation temperature of the PTC device, thereby insuring the PTC device can expand as necessary into the softened gasket. The inclusion of additional parts (e.g., two or more gaskets) increases manufacturing complexity and cost.

U.S. Pat. No. 6,620,544 discloses and electrochemical cell that relies upon a metal foam "shock absorber" and a separate insulating ring both positioned proximate to the PTC device. Here, the metal foam allows for expansion of the PTC device upon activation, while the insulating ring is thicker than the PTC device to allow for proper spacing of the parts when the cell is sealed. As with U.S. Pat. No. 5,376,467 above, this arrangement requires the use of a smaller diameter PTC device.

Finally, Japanese Publication No. 10-162805 contemplates providing a PTC device along the central axis of the cell. Here, the PTC device avoids exposure to crimping forces by limiting its overall diameter, although this limited diameter reduces the effectiveness of the PTC device by limiting the amount of surface area in contact with the electrode. Moreover, this central location of the PTC device prevents the inclusion of common venting devices. Finally, as noted in the reference, some embodiments of this arrangement permit the PTC device to be in contact with the organic electrolyte contained within the cell housing. In such instances, the PTC device must not react with or dissolve in the organic solvents, thereby presenting a significant technical challenge in terms of chemical compatibility.

SUMMARY OF THE INVENTION

In view of the above, the invention contemplates, inter alia, a lithium electrochemical cell design with a PTC device that has the ability to limit current flow therethrough at desired temperatures (typically occurring under abusive conditions), while at the same time not limiting the ability of the PTC device to activate and without substantially reducing its surface area or shape. Additionally, this cell design maintains reliable, compressive sealing forces over extended periods of time both before and after activation of the PTC device and without directly exposing the PTC device to the organic solvents of the electrolyte.

The PTC devices in this invention typically experience a phase change to limit current flow at temperatures between 85° C. and 175° C. Ultimately, the preferred activation temperature for the PTC will be dictated by the design, as well as the melting point of the other cell materials (e.g., the gasket polymer(s)) and/or the temperature at which the cell may vent. As noted above, the surface area of the PTC disposed within the electrical pathway of the battery (i.e., between the electrode and the terminal) should be maximized to insure the most efficient utilization of the PTC.

The cell design includes a closure assembly affixed to the open end of a battery container. The closure assembly includes the PTC and forms an effective barrier to electrolyte vapor transmission that insures the battery will not explode when subjected to abusive conditions such as overcurrents or excessive temperatures. The design of the closure assembly exerts radial and axial forces primarily within the sealing gasket to prevent electrolyte egress and moisture ingress, but the PTC device present in the end assembly is partially or completely shielded from primary axial compression forces without interfering with the venting mechanism. Notably, the gasket must be made of a material that is electrically insulating, resistant to chemical degradation by the electrolyte and impervious to cold flow or loss of its structural and mechanical integrity over long periods of time. Insert molding may be use to integrate the gasket directly into another component such as the container or closure assembly, or more particularly the cover or rollback cover of the closure assembly.

By altering the cross sectional shape of the sealing gasket, the PTC device is removed from the compressive forces necessary to effectively seal the battery, both during manufacturing and the subsequent storage/use of the battery. This arrangement allows the PTC device to: i) avoid damage during manufacture, ii) expand during activation and iii) reduce electrical resistance by maximizing the surface area for electrical connection between the internal electrode of the battery and the external terminal of the battery housing.

Specifically, the closure assembly is formed to create two axial compression zones: a primary zone and a secondary zone (i.e., respectively speaking, a zone underneath the crimp where axial compression is exerted and a zone concentrically adjacent to the second wall of the gasket where minimal compression is exerted). The primary zone is responsible for maintaining the closure seal of the cell, and it can be affected by the crimp or the crimp working in conjunction with an annular bead made in the sidewall of the container. The secondary zone has less compressive force than the primary zone. In this manner, the PTC device is exposed to less axial compression force than the other respective parts of the closure assembly, thereby avoiding damage to PTC device and also allowing it to activate without constraint. Notably, a gasket material must have sufficient rigidity to permit formation of these high and low compression zones, and use of a single injection molded thermoplastic material for the dual wall gasket is advantageous because it allows for mass production of the part while avoiding material compatibility and related issues.

In one embodiment, the annular seal member (i.e., the sealing gasket) has an E-shape cross section (in a final, closed cell), although the original cross sectional shape of the gasket may be similar to an F-shape where crimping of the open end partially or completely compresses a terminal flange of the gasket in a radial direction. In each instance, a radial protrusion oriented along the the axial inner side wall of the annular gasket is constructed to fit concentrically around the PTC device. The gasket may also have upper and lower flanges which protrude radially inward at the upper and lower terminus of the inner diameter of the annulus. The protrusion has a greater height (measured along the axis of the container) as compared to the PTC device. Because the protrusion, and more generally the entire gasket, is constructed from a material that maintains its rigidity at the activation temperature of the PTC device, the protrusion helps to shield the PTC device from unwanted primary axial compression forces, both during manufacture of the cell and in the subsequent operation thereof. The protrusion also permits other features of the end assembly, which is associated with the PTC device, to be received by the gasket, thereby imparting a better radial and axial seal between the assembly, the gasket and the container. Multiple protrusions may also be provided. Additionally or alternatively, the upper and lower flanges need not be specifically molded to have inward protrusions and instead could be shaped by the closing process of the cell itself (e.g., crimping).

Ultimately, a complete description of the invention, including its various features and embodiments, can be found by referencing the description and claims below.

BRIEF DESCRIPTION OF THE DRAWINGS

The invention will be better understood and other features and advantages will become apparent by reading the Detailed Description of the Invention, taken together with the drawings, wherein.

DETAILED DESCRIPTION OF THE INVENTION

As used throughout this specification, the term "electrochemical cell" is afforded a broad meaning, including any system capable of producing electrical current with a positive electrode, a negative electrode, a separator and an electrolyte, although the invention is most applicable to systems using nonaqueous electrolytes. A cylindrical container is any tubular container, with at least one open end, whose axial height is greater than its diameter. In the context of the gasket, a "protrusion" or "projection" is a horizontally-oriented feature that projects radially inward from the axial sidewall of the gasket; as such, a protrusion is structurally and functionally distinct from a flange oriented at the top or bottom of the gasket (irrespective of whether the flange is crimped or positioned in a radial direction or more of an axial direction).

Figure 1:
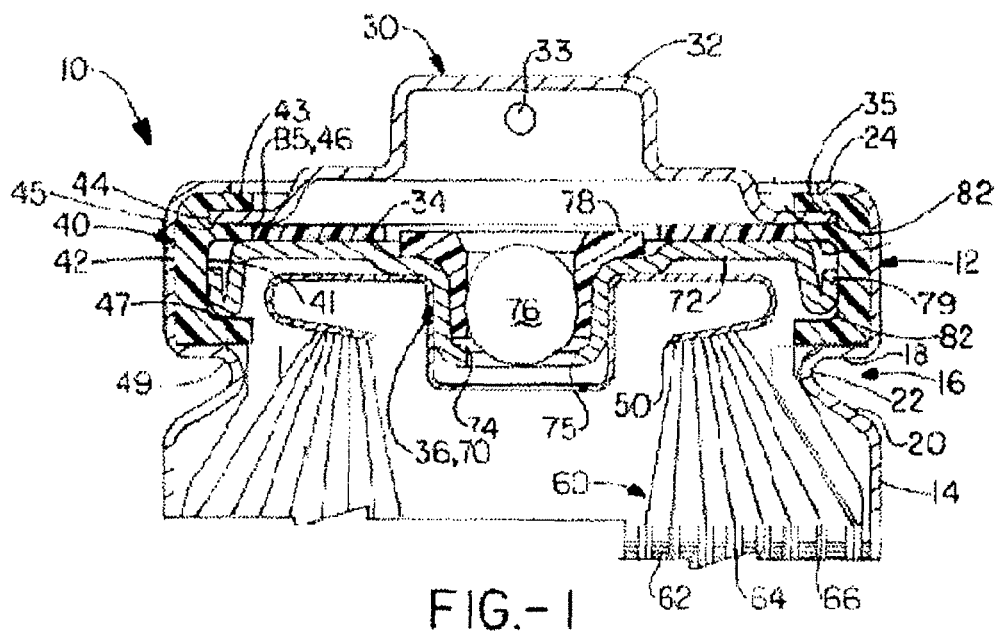
FIG. 1 is a cross-sectional view of one embodiment of the invention having a gasket and an end assembly, including a ball vent, with multiple axial compression zones.

The invention relates to electrochemical cells, preferably containing lithium or lithium alloy as an electrochemically active material and a non-aqueous electrolyte, with a cell closure assembly including a cylindrical container having an open end sealed by an end assembly including a pressure release vent member capable of venting when the internal pressure of the cell is at or above a predetermined pressure. The invention will be better understood with reference to the drawings, wherein FIG. 1 illustrates one embodiment of a cylindrical electrochemical cell 10 of the present invention. Cell 10 is a primary FR6-type cylindrical Li/FeS$_2$ cell. However, it is to be understood that the invention is applicable to other cell types, materials and constructions.

Cell 10 has a housing 12 that includes a container 14 in the form of a can with a closed bottom and an open top end into which a closure assembly is fitted. The mechanical strength, closing/sealing requirements and internal cell designs associated with cylindrical cells are markedly different from those of coin or button cells, especially insofar as a cylindrical shapes posses the superior hoop strength and do not experience axial swelling commonly encountered in coin and button cells.

The open top end of container 14 is closed with an end assembly 30 that cooperates with the open top end. The container 14 has a circumferential inward projection or bead 16 near the top end of the container that supports a portion of the end assembly 30. Bead 16 is generally considered to separate the top and bottom portions of the container 14. The closure assembly including container 14 and end assembly 30 fits within the top portion of container 14 and seals the electrode assembly 60 within the bottom portion of the container 14. The electrode assembly 60 shown here is a "jellyroll construction" that includes an anode or negative electrode 62, a cathode or positive electrode 64 and a separator 66 spirally wound together. One or multiple layers of separator 66 may be used to allow ionic conduction and prevent direct electrical contact between the electrodes 62, 64. Electrolyte is also disposed within the container 14.

The container 14 can be one of several geometric shapes for open-ended containers, for example, prismatic and rectangular containers, provided that the teachings regarding the closure assembly are followed. As the sealing of an open-ended cylindrical cell presents challenges regarding the radial and axial forces required to create the seal, the end assembly 30 which cooperates with the container 14 to minimize vapor transmission is expected to have particular applicability to cylindrical containers.

Container 14 is preferably a metal can having an integral closed bottom. However, a metal tube that is initially open at both ends may be used in some embodiments. Container 14 in one embodiment is steel that is optionally plated, for example, with nickel on at least the outside to protect the exposed surface of the container from corrosion or to provide a desired appearance. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other metals may be used to meet special needs as is known in this art; for example, stainless steel may be used when the open circuit voltage of the cell is designed to be greater than or about 3 volts, or when the cell is rechargeable in order to provide relatively greater corrosion-resistance. Examples of alternative container materials include, but are not limited, stainless steels, nickel plated stainless steels, nickel clad stainless steel, aluminum and alloys thereof.

Figure 2:
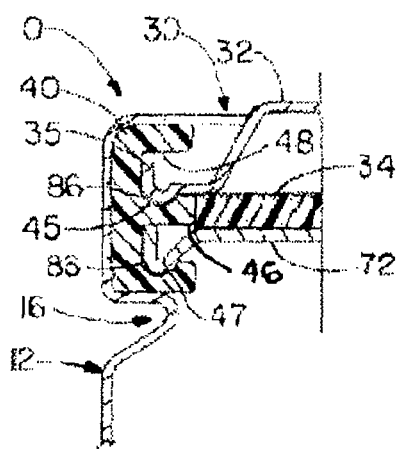
FIG. 2 is a cross-sectional elevational view of a further embodiment of FIG. 1.

As illustrated in FIGS. 1 and 2 in particular, bead 16 is an inward projection, preferably extending circumferentially around the cylindrical container. Bead 16 has an upper wall 18, a lower wall 20 and transition member 22 which connects the upper wall 18 to lower wall 20. Upper wall 18 can be inclined upwardly towards the radial center of the cell. The bead 16 provides the desired axial compression between the upper wall 18 and the crimped end 24 of container 14. Ultimately, bead 16 is provided to help create and maintain axial closing forces during and after the sealing of the container 14 and end assembly 30. Further details on the bead can be found in U.S. patent application Ser. No. 12/136,910 (United States Publication No. pending), filed on Jun. 11, 2008, which is incorporated by reference herein.

The end assembly 30 is disposed in the top portion of container 14 and includes a terminal cover 32 having a conductive contact that serves as one of the cell's terminals, a PTC device 34 that limits or interrupts current flow through the cell, a rupturable pressure release vent mechanism 36, a gasket or seal member 40 and a contact member 50 such as a welded lead or spring that defines an opening as illustrated in the arrangement of FIG. 1. An electrically insulating polymeric gasket 40 may be positioned between the container 14 and the components of the end assembly 30, such that the end assembly 30 has a polarity that is different from that of the container 14.

The PTC device 34 is disposed in an electrical path between the contact terminal cover 32 and the positive electrode 64 of electrode assembly 60. Thus, when the PTC device is activated by abusive conditions, electrical current flowing from the electrode assembly 60 to the terminal cover 32 is severely restricted, if not completely eliminated. In this manner, the PTC protects the cell 10 from damage or disassembly when the cell is exposed to abusive conditions such as over-current and/or over-temperature conditions caused by, for example, external short circuiting of the cell, abusive charging, reverse installation or forced discharge. The conductive contact terminal 32 preferably protrudes above the end of container 14 and is held in place by the inwardly crimped end 24 of container 14 with insulating gasket 40 disposed therebetween. As noted above, the crimped end 24 exerts axial closing force. This crimp is performed in the closing operation of cell 10; that is, the container 14 is beaded with the end assembly 30 fitted in place, then the end 24 is crimped to create axial compression as described above.

Electrochemical cells, and particularly those that include lithium or a lithium-based alloy, may be subjected to abusive conditions (e.g., elevated temperature, overcurrent, etc.) caused by internal or external short circuits, unintended charging, malfunctioning or poorly designed devices and the like. Thus, PTC device 34 is a key safety component in cell 10. PTC device 34 is a resettable device exhibiting positive temperature coefficient behavior wherein the electrical resistance of the device increases with an increase in temperature.

In one preferred embodiment, the PTC device 34 comprises a polymer having conductive particles dispersed therein. Specifically, the PTC device 34 comprises polyethylene and electrically conductive particles such as carbon. Other types of particles, such as conductive metals, for example nickel can also be utilized. Below the typical operable temperature range of 85-170° C. for most PTC and the more preferred temperatures of between approximately 85-125° C. (which coincides with the desired maximum operating temperature range for most consumer electrochemical cells), the conductive dispersed particles in the PTC form a relatively low resistance electrical path through the polymer. The lower end of the general temperature range is dictated by desire for the cell to function at a temperature of about 85° C. The upper end of the general temperature range is dictated by the melting point of cell components, such as the seal and electrochemically active materials. The ability of the PTC device to trip depends on compression on the PTC and other factors, including density of the PTC device.

If or when the temperature of the PTC device 34 rises above a switching temperature (also referred to as herein as "activation" of the device), the polymer changes phase. This phase change increases the volume of the polymer such that most of the dispersed conductive particles separate, breaking the low resistance electrical path and dramatically increasing the resistance of the PTC device. As the resistance increases, the amount of current that can flow through the PTC device is reduced. When the temperature of the PTC device is decreased to the operating range, the polymer recrystallizes and conductive particles move closer in proximity to one another and restore the low-resistance state of the PTC device.

A preferred PTC device 34 for cylindrical electrochemical cells comes in the shape of an annulus with a central aperture for allowing fluid to pass therethrough. In particular, the aperture accommodates a venting mechanism to insure that explosive pressures do not build up within the sealed container. However, the amount of surface area of the PTC which forms the electrical path should be maximized to help minimize the resistive effect of the PTC on the cell itself. Thus, preferred PTC devices have a diameter that is relatively close to the maximum diameter permitted by the container, while the central aperture is minimized. Appropriate PTC devices are commercially available from numerous sources. Suitable PTC device are sold by Bourns, Inc. of Riverside, Calif., USA, and Tyco Electronics in Menlo Park, Calif., USA.

PTC devices add to the internal resistance of the cell. Typically, this added resistance should not exceed approximately 36 mΩ in a AA form factor, and lower resistance devices of approximately 18 mΩ in a AA form factor are now becoming available. Optimally, the device will limit a voltage of up to 15 V DC and a current of up to 20 A. The diameter of the PTC should correspond to the diameter of the end assembly as discussed in greater detail below. The vent aperture should be sized to cooperate with the venting mechanism, with a diameter between 2.5 and 5.5 millimeters being appropriate. The thickness (or "axial height" as used below) of the PTC device should range between about 0.25 and 0.50 millimeters (1 to 2 mils) and more preferably between 0.30 and 0.35 millimeters, depending upon the exact configuration of elements in the end assembly 30.

A problem with maintaining the PTC device 34 in the end assembly 30 is that a seal must be maintained between the container 14 and the end assembly 30 to prevent leakage of the cell electrolyte. As the seal is typically formed utilizing pressure, generally by forming a compression seal between the container 14 and end assembly 30, in both the axial and radial directions of the cell, the PTC device 34 can be subject to compressive forces that are necessary to insure a reliable seal is formed. However, compression of the PTC device 34 by the end assembly 30 and container, and more specifically by the combined axial compression effects of the crimped end 24, the rigidity of the gasket 40 and the upper wall 18 of the bead 16, can limit expansion and thereby affect its performance. Challenges of the invention are thus to provide the PTC device in the end assembly; to isolate the PTC device from contact with the electrolyte (thereby impacting activation of the PTC device), ambient environment outside the cell and external physical contact (to prevent shorting around the active portion) and to minimize compression in the PTC device while maintaining the PTC in a desired position within the cell to allow for desired expansion on activation (and thus the ultimate desired performance of the PTC device). Use of less rigid polymer materials, as suggested by the references discussed above, can lead to unwanted cold flow of the gasket, leakage of the electrolyte and generally unacceptable seal performance for end assembly 30. Moreover, the material of the gasket must have sufficient rigidity to meet the criteria described herein.

Figure 8:
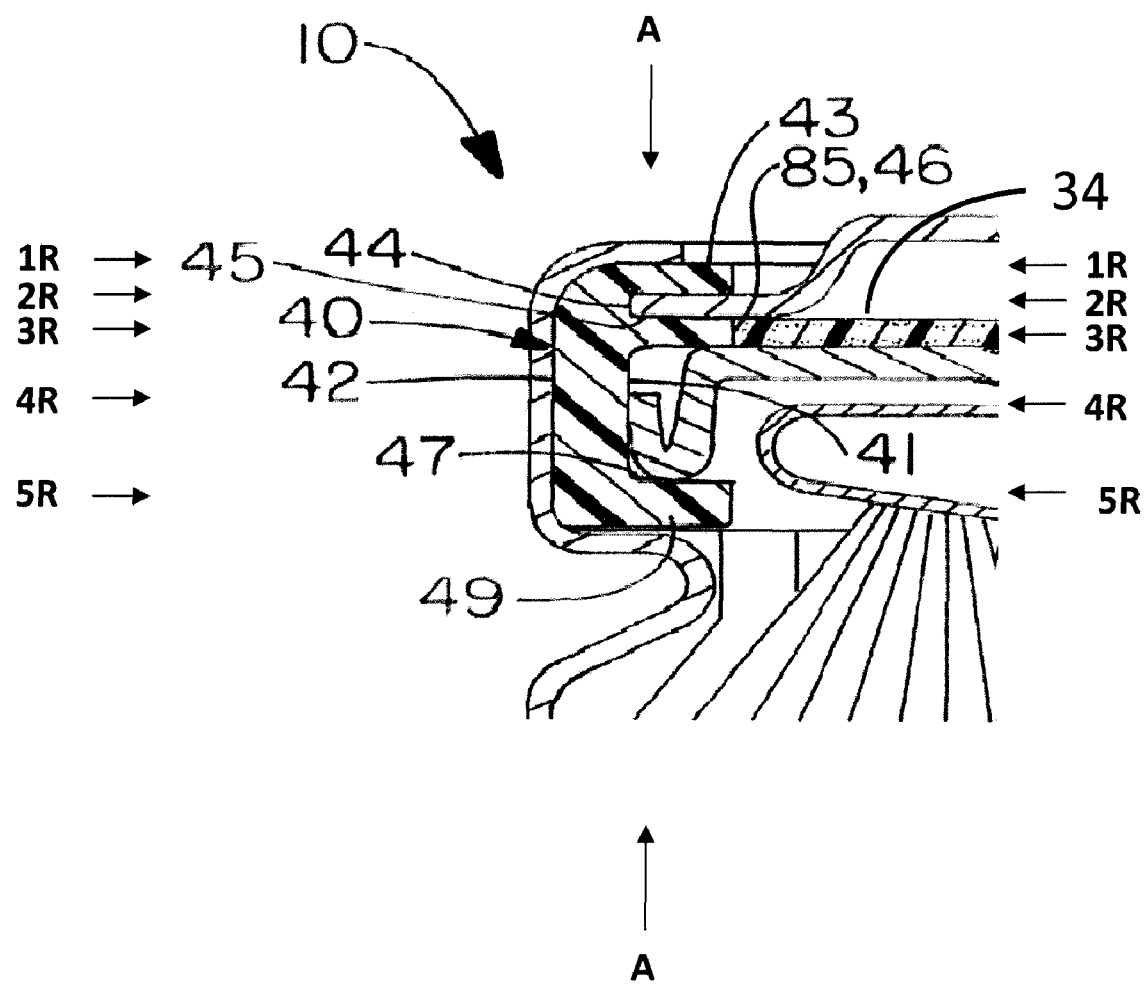
FIG. 8 is a cross-sectional view of one embodiment of the invention illustrating the axial compression force and the varying diameters of the gasket, which may be applicable to any of the embodiments illustrated in FIGS. 1-6.

In order to allow the PTC device 34 to achieve a desired expansion, the PTC device 34 is located in the end assembly 30 so as to remove it from the primary axial compression forces. The term primary axial compression force is defined herein as the greatest or maximum axial pressure exerted along the axis of the cylindrical container during the sealing of the end assembly 30, as well as the resulting compressive force maintained in the sealed cell. For example, FIG. 8 illustrates a primary axial compression force on an axial line extending through line A-A, and the axial compression zone is bounded by the upper wall 18 of bead 16 and the crimped end 24 of container 14, although the precise amount of force exerted depends, in part, on the material of the container, the crimp conditions and the rigidity of the material of the gasket. However, it will be understood that lesser (or, as used herein, "secondary") axial compression is still exerted throughout the components of the end assembly. The amount of force will be less than the primary compression zone, thereby allowing activation of the PTC device.

As noted above, the PTC device 34 has an annular construction with the outer diameter or periphery of the PTC device 34 located concentrically within one or more discrete axially extending wall sections or protrusions 46 bounded above and below by cavities 82 into which different components of the end assembly 30 are received, all of which is described in greater detail below. In this manner, the PTC is disposed radially inward from the primary axial compression force exerted on the cell closure assembly, and the PTC is in the zone of secondary axial compression This zone includes the components bounded by portion of the terminal cover 32 that are radially concentric to the crimped end 24, the PTC device 34 and the vent mechanism 36.

A preferred construction for lessening axial pressure on the PTC device 34 includes a gasket 40 that is: i) nonconductive and isolates desired cell components of opposite polarity, and ii) formed from a plastic that is reliably compressible to aid in forming a sealed closure assembly but resistant to cold-flow or other unwanted deformation. The thermoplastic used to mold gasket 40 must also maintain sufficient rigidity, even when exposed to the activation temperature of the PTC device 34. Gasket 40 is formed as a hollow cylinder or annulus having one or more inward facing radial protrusions 46, oriented in a plane that is substantially perpendicular (i.e., horizontal) to the axial length of the gasket. In a preferred embodiment, the protrusion may be formed continuously around the inner diameter of the gasket, thereby resulting in a smaller inner diameter for the protrusion as compared to the axial regions of the gasket directly above and below the protrusion.

With reference to FIG. 8, the specific diameters for each portion of gasket 40 can be more precisely defined. Upper flange 43 and lower flange 49 extend radially inward from a axial sidewall of the gasket 40, which may comprise axial inner sidewall portions 41, 44. In conjunction with protrusion 46, wall portions 41, 44 define cavities 82 (shown in FIG. 1 and FIG. 6) into which portions of the end assembly may be received to form an axially and radially compressive seal. Axial outer sidewall 42 of the gasket 40 cooperates with container 14 to complete the compressive seal, preferably with a constant diameter defining outer sidewall 42. Thus, the inner axial wall of the gasket may comprise 5 discrete diameters, as indicated by lines 1R-1R, 2R-2R, 3R-3R, 4R-4R and 5R-5R. In order to shield the PTC from primary axial compression, diameter 3R-3R must be smaller than that of 2R-2R and 4R-4R. Preferably, 2R-2R is approximately equal to 4R-4R. Owing to the crimping of flange 43, diameter 1R-1R will be smaller than that of 2R-2R. And to the extent that gasket 40 is seated within the bead 16, the diameter 5R-5R, defined by flange 49, will be smaller than that of 4R-4R. In this manner, a preferred embodiment of gasket 40 will have an E-shape when viewed in cross section. In the event a bead 16 and/or flange 49 is not provided, the gasket may instead take on an F-shape when viewed in cross section, and in the event flange 43 is absent and/or crimping does not extend beyond the inner diameter of wall portion 41, protrusion 46 may be the only substantial section of reduced diameter.

FIG. 1 illustrates the stack of cell components located between the upper wall 18 of bead 16 and the crimped end 24 of container 14. The PTC device 34, by virtue of its location in the cell abutting protrusion 46 at interface 85, remains oriented concentrically within the protrusion 46 in a zone of secondary axial compression (i.e., an area of compression less than the primary axial compression force). As shown, less, axial compression force is exerted along the entire length of the PTC device 34.

As noted above, cavities 82 are defined by protrusion 46 and inner sidewall portions 41, 44. The radial depth of each cavity is sufficient such that a portion of the end assembly component situated in the cavity is subjected to the primary axial compression forces exerted on the closure assembly. In one embodiment, the seal member inner surface 44 receives terminal cover 32 in cavity 82. Terminal cover 32 rests on seat 45 formed by protrusion 46. Seat may further include an annular groove 86 (shown in FIG. 2) which receives and cooperates with the terminal cover. Also as shown in FIG. 2, the peripheral edge 35 of terminal cover 32 may be adapted to fit within groove 86 and/or to better exert radial compressive force wall portion 44. Similarly, vent mechanism 36 fits into a lower cavity 82 at sidewall portion 41, thereby causing the end assembly 30 to surround protrusion 46 on all of its exposed edges. Here again, the vent mechanism may include an inner cover 72 that terminates with a "rollback" portion 79. When present, flange 49 may form a seat 47. Seat 47 may also possess an annular groove 86 which cooperates with vent 36, and more particularly rollback cover 79, to better perfect the fit between the end assembly 30 and the gasket 40.

Notably, protrusion 46 has an axial height that at least matches the axial height of PTC device 34. In the event the axial height of the protrusion 46 exceeds that of the PTC 34, relief from primary axial compression may be realized. Moreover, the PTC device 34 should abut the protrusion 46 along its inner diameter at interface 85 in order to maximize the size/surface area of the PTC.

Current generated by electrode assembly 60 flows through the end assembly 30 by the following preferred pathway: electrode assembly 60 (either the positive electrode or negative electrode), contact member 50 (in FIG. 1, provided in the form of a spring), conductive inner vent cover 72, PTC 34 and out to terminal cover 32. In this arrangement, current flow from the cell can be stopped by activation of the PTC 34, which may be triggered by the conditions described above.

In view of the description of FIG. 1, it should be evident that primary axial compression forces are exerted on a stack of components of the closure assembly including crimped end 24 of container 14, seal member 40, terminal cover 32, protrusion 46, vent member 36 and upper wall 18 of bead 16; and the PTC device 34, due to its location in the cell, is not subjected to the primary axial compression forces. Thus, seal member 40 provides for multiple radial and axial compression areas, both primary and secondary axial compression areas, between the closure assembly components, namely the container 14 and the end assembly 30 including the seal member 40. The design is adapted to reduce the ability of electrolyte vapor to escape from the cell as well as reduce the ability of water to enter the cell, and further to isolate the PTC device 34 from the primary axial compression forces of the closure assembly.

The seal member 40 is made of a material composition that can form a compression seal with other cell components of the closure assembly and it also has low vapor transmission rates in order to minimize, for example, the entry of water into the cell and loss of electrolyte from the electrochemical cell. The seal member 40 can include a polymeric composition, for example, a thermoplastic polymer, composition of which is based in part upon factors such as chemical compatibility with the components of the electrode assembly, namely the negative electrode, positive electrode, as well as the electrolyte, such as a non-aqueous electrolyte utilized in the electrochemical cell 10. The seal member is made from any suitable material that provides the desired sealing and insulating properties. The seal member material must maintain sufficient rigidity that is greater than the rigidity of the PTC device (i.e., upon closing of the cell, the gasket material must not be so compliant as to fail to shield the PTC device from primary axial compression). Examples of suitable materials include, but are not limited to, polyethylene, polypropylene, polyphenylene sulfides, tetrafluorideperfluoroalkyl vinyl ether copolymer, polybutylene terephthalate, ethylene tetrafluoroethylene, polyphthalamide, or any combination thereof. Owing to their superior rigidity, preferred gasket materials are polyphthalamides (e.g., Amodel® ET 1001 L from Solvay Advanced Polymers of Alpharetta, Ga., USA) or possibly polyphenylene sulfides (e.g., TECHTRON® PPS from Boedeker Plastics, Inc., Shiner, Tex., USA), both described in United States Patent Publication Nos. 20050079404 and 20050079413, are hereby incorporated by reference. The seal member compositions can optionally contain reinforcing fillers such as inorganic fillers and/or organic compounds.

The seal member 40 may be coated with a sealant to further enhance sealing properties. Ethylene propylene diene terpolymer (EPDM) is a suitable sealant material, but other materials can be used.

The conductive terminal cover 32 can be provided with one or more vent apertures 33 to allow release of fluid if vent mechanism 36 is breached. Terminal cover 32 can be made from the same or similar materials as those identified as being appropriate for the container; for example, nickel plated cold rolled steel (pre or post plated), nickel plated stainless steel or a nickel alloy. Nickel plated stainless steel is preferred in one embodiment. Ultimately, the terminal cover should have good resistance to corrosion by water in the ambient environment, include a conductive portion with good electrical conductivity, and when visible on consumer batteries, have an attractive appearance. Conductive portions of the terminal cover are often made from nickel plated cold rolled steel or steel that is nickel plated after the cover has been formed.

Pressure release vent mechanism 36 is present so that the cell contents can be substantially contained within the electrochemical cell 10 below a predetermined pressure. The pressure release vent mechanism 36 can be, for example, a ball vent or a foil vent. Gases are generated within the cell due to environmental conditions such as temperature and, in certain instances, generated during normal operation through chemical reactions. When the pressure within the electrochemical cell is at least as high as a predetermined release pressure, a portion of the vent mechanism 36 ruptures and allows fluid, in the form of liquid or gas or a combination thereof, within the cell to escape through the opening created in the vent mechanism 36. The predetermined release pressure can vary according to the chemical composition of the cell. The predetermined pressure is preferably above a pressure which will avoid false vents due to normal handling and usage or exposure to the ambient atmosphere. For example, in a FR6-type lithium-containing electrochemical cell, the predetermined release pressure, for example the pressure at which the vent mechanism 36 creates an opening, for example, via rupturing, can range from about 10.5 kg/cm$^2$ (150 lbs/in$^2$) to about 112.6 kg/cm$^2$ (1600 lbs/in$^2$) and in some embodiments, from about 14.1 kg/cm$^2$ (200 lbs/in$^2$) to about 56.3 kg/cm$^2$ (800 lbs/in$^2$) at room temperature, about 21° C. The pressure at which the pressure release vent mechanism 36 ruptures can be determined by pressurizing a cell, e.g., through a hole punctured in the container. Examples of a foil vent design can be found in United States Patent Publication Nos. 20050244706, 20060228620 and 20080213651, all of which are incorporated by reference.

The vent mechanism 36 illustrated in FIG. 1 is a ball vent. Ball vent 70 includes a radial sealing portion, a central vent well 74 and a vent aperture 75 sealed by a vent ball 76. Vent bushing 78 may be made from a thermoplastic material similar to those described as appropriate for the gasket above. The vent bushing 78 allows sufficient compressibility the vertical walls of the vent well 74 and the periphery of the vent ball 76 to maintain a hermetic seal under normal (i.e., non-abusive) conditions. When the cell internal pressure exceeds the predetermined level, the vent ball 76 or both ball 76 and bushing 78 are forced out of the aperture 75 to release pressurized fluid from the cell 10.

Vent sealing portion 72 terminates at its periphery with a U-shaped wall (also referred to as a "rollback cover") 79. The rollback cover 79 engages the gasket 40 as described above. The configuration of the peripheral wall 79 aids in forming an electrolyte migration barrier and possesses spring-like characteristics and aids in providing radial compression with seal member 40 in conjunction with the adjacent sidewall or container 14. The electrochemical cell may includes a conductive contact member 50 electrically connected to the vent mechanism 36, and more specifically to one or both of the radial sealing portion 72 and rollback cover 79. As such, these portions of the vent must be electrically conductive. Container 14, seal member 40 and vent mechanism 36 cooperate to maintain the electrode assembly 60 and electrolyte in the lower portion of container 12.

The vent ball 76 can be made from any suitable material that is stable in contact with the cell contents and provides the desired cell sealing and venting characteristics. Glasses or metals, such as stainless steel, can be used. The vent ball should be highly spherical and have a smooth surface finish with no imperfections, such as gouges, scratches or holes visible under 10 times magnification. The desired sphericity and surface finish depends in part on the ball diameter.

Notably, the configuration illustrated in FIG. 2 locates the height of the terminal cover relative to the bead in order to minimize variation stack up height and cell height. This minimizes variation in compression on the PTC device. The arrangement also provides a relatively longer path for vapor transmission around the inner surface of the seal member by having the seal member under compression in two zones, one adjacent the inner cover 72 and a second adjacent the terminal cover 32.

Figure 3:
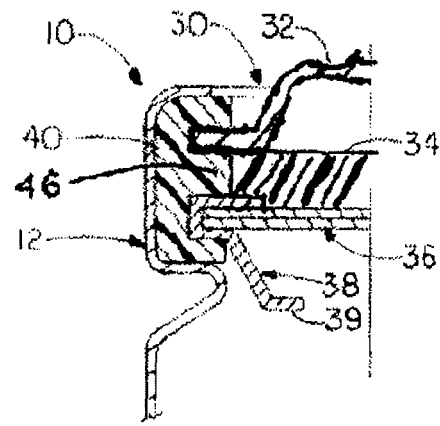
FIG. 3 is a cross-sectional elevational view of one embodiment of the invention having a gasket and a closure assembly, including a foil vent, multiple axial compression zones.

A further embodiment of the present invention set forth in FIG. 3, which includes a vent mechanism 36 and is specifically a foil vent. As utilized in the present invention, the term foil vent refers to a vent construction having one or more layers and includes, for example, a laminate foil vent having two or more different layers, with a portion of the foil vent being rupturable in response to being subjected to at least a predetermined amount of pressure. Vent mechanism 36 illustrated in FIG. 3 is a laminate type foil vent having a central area adapted to rupture upon being subjected to a predetermined pressure from within the cell, namely the compartment housing the electrode assembly.

As illustrated in FIG. 3, a electrical contact member 38 can be considered as a discrete component of the vent mechanism 36 that is electrically connected to the conductive contact terminal 32 via PTC device 34 on one side and to the electrode assembly 60 on the opposite side (not illustrated). Ultimately, the contact member 38 has a shape that conforms to the gasket 40 (and specifically the inner wall and seat), the vent mechanism 36 and the terminal cover 32. The "sideways J" shape shown in FIG. 3 is one preferred embodiment, where the top end of the member 38 is oriented along a substantially radial plane to maximize the surface area in contact with the PTC 34 (thereby reducing resistance), while the tab or lower leg 39 of member 38 extends both axially and radially into the interior of the container 14 in order to establish electrical contact with one of the electrodes (typically, the positive electrode). For example, the current collector of the positive electrode 64 may be an electrically conductive substrate, such as copper, aluminum or other metal foil or mesh, that extends beyond the positive electrode materials and the separator 66. Electrochemically active positive electrode material(s) are then coated onto this substrate.

Contact members 38 and 50, if used, can be made of one or more conductive materials, preferably having spring-like characteristics, although any component which makes and maintains a sufficient electrical contact with the desired components can be utilized. These members 38, 50 may simply maintain a pressure contact with the electrode assembly 60, or they may make a fixed connection, via welding, adhesion or otherwise, with the assembly 60.

When the end assembly 30 is placed into container 14 during assembly, the current collector is biased against tab 39 of contact member 38 which, as indicated above, is resilient and/or resistant to force. The characteristics of tab 39 aid in maintaining contact between contact member 38 and current collector. Optionally, the tab 39 can be welded to the current collector, maintain contact via spring-force or through the use of an intermediary conductive lead, such as a narrow metal strip or wire that can be welded to both the tab 39 and current collector. Welded connections can sometimes be more reliable, especially under relatively harsh handling, storage and use conditions, but pressure connections do not require additional assembly operations and equipment.

As illustrated in FIG. 3, vent mechanism 36 is disposed in the opening defined by the peripheral flange of the contact member 38. More specifically, the vent mechanism 36 periphery is secured by the folded end of the peripheral flange of contact member 38. The seal between the vent mechanism 36 and contact member 38 can be the result of tight pressure contact at the interfacial surfaces, which can, in some embodiments, be enhanced by axial compression of the peripheral portion of the vent mechanism 36. Optionally, an adhesive or sealant can be applied to the desired interfacial surfaces to connect the vent mechanism 36 to contact member 38 and thereby form a desired seal. Primary axial compression forces generated during crimping or closing of the container 14 during assembly of the cell are also placed on the peripheral portion of a vent mechanism 36 and contact member 38.

Figure 5:
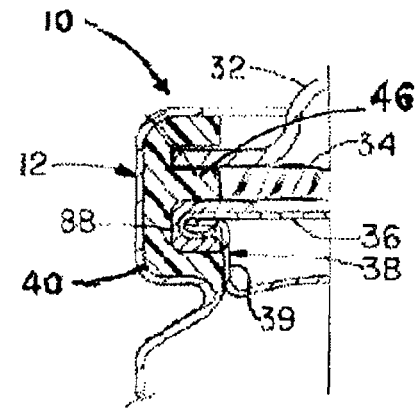
FIG. 5 is cross-sectional view of a yet another embodiment of FIG. 3 or 4.

FIG. 5 illustrates a further embodiment of the present invention with particular applicability to the use of a foil vent as the vent mechanism 36. Here, a retainer cup 88 is utilized to form a subassembly sandwiching the foil vent (generically designated as vent mechanism 36) and contact member 38. Thus, retainer 88 engages the seat 47 of gasket 40. Retainer 88 is formed including a conductive material which is disposed in the electrical path between contact member 38 and PTC device 34. Use of such a retainer may simplify manufacturing processes.

The foil-type pressure release vent mechanism 36 shown in FIG. 3 includes at least one layer of a composition of metal, polymer, or mixtures thereof. It is also possible that the foil-type pressure release vent mechanism 36 can include two or more layers of different material compositions. For example, a second layer having a different composition than a first layer may be used for purposes of bonding the pressure release vent mechanism 36 to a retainer 88 such as shown in FIG. 5, or to the contact member 38. In another example, a second and a third layer having a different composition than the first layer may be used to bond the pressure release vent mechanism 36 to both the retainer 88 and the contact member 38. Also, multiple layers having two or more compositions can be used for tailoring the performance properties, for example, strength and flexibility, of the pressure release vent mechanism 36. Ideally, separate layers would be provided on the basis of compatibility with the electrolyte, ability to prevent vapor transmission and/or ability to improve the sealing characteristics of the vent mechanism 36 within the end assembly. For example, an adhesive activated by pressure, ultrasound and/or heat, such as a polymer or any other known material in the adhesive field that is compatible with the elements disclosed herein, could be provided as a layer of the vent mechanism 36 in order to bond the vent member within the end assembly.

Compositions suitable for use in the foil-type pressure release vent mechanism 36 can include, but are not limited to, metals such as aluminum, copper, nickel, stainless steel and alloys thereof; and polymeric materials such as polyethylene, polypropylene, polybutylene terephthalate (PBT), polyethylene terephthalate (PET), ethylene acrylic acid, ethylene methacrylic acid, polyethylene methacrylic acid, and mixtures thereof. The composition of the pressure release vent mechanism 36 can also include polymers reinforced with metal, as well as a single layer or a multi-layer laminate of metals or polymers or both. For example, the single layer can be a metal foil, preferably aluminum foil, that is substantially impermeable to water, carbon dioxide and electrolyte, or a non-metallized film of a polymer coated with a layer of oxidized material that prevents vapor transmission, such as, for example $SiO_x$ or $Al_2O_x$. The pressure release vent mechanism 36 can furthermore contain an adhesive layer that contains a contact-bonding adhesive material, for example polyurethane, or a heat, pressure and/or ultrasonically activated material, for example low density polyolefins. Alternatively, these or other adhesives or sealant materials can be separately applied to a portion of the pressure release vent member (e.g., the outer periphery coming into contact with contact member 38, a retainer 88, or both for enhancing the seal within the collector assembly. A preferred laminar vent construction would have four layers consisting of oriented polypropylene, polyethylene, aluminum foil and low density polyethylene.

Regardless of the composition, the pressure release vent mechanism 36 should be chemically resistant to the electrolyte contained in the cell 10 and should have a low vapor transmission rate (VTR) to provide a low rate of weight loss for the cell 10 over a broad range of ambient temperatures. For example, if the pressure release vent mechanism 36 is metal which is impervious to vapor transmission, the VTR through the thickness of the pressure release mechanism 36 is substantially zero. However, the pressure release vent mechanism 36 can include at least one layer of vapor-permeable material, for example polymeric materials, as described above, that can function, for example, as an adhesive or as an elastomeric layer to achieve a desired seal between the pressure release vent mechanism 36 and another cell component, preferably contact member 38.

The predetermined release pressure, or the pressure at which the pressure release vent mechanism 36 is intended to rupture, is a function of its physical properties (e.g., strength), its physical dimensions (e.g., thickness) and the area of the opening, for example as defined by the contact member 38 illustrated in FIG. 3, and the opening defined by the PTC device, whichever is smaller. The greater the exposed area of the pressure release vent mechanism 36, the lower the predetermined release pressure will be due to the greater collective force exerted by the internal gases of the electrochemical battery cell 10. Consequently, adjustments may be made to any of these variables in order to engineer an end assembly with a vent member without departing from the principles of the invention.

Depending upon the exposed area of the vent mechanism 36, the thickness of the pressure release foil-type vent member can be less than about 0.254 mm (0.010 inch), and in some embodiments can range from about 0.0254 mm (0.001 inch) to about 0.127 mm (0.005 inch), and in yet other embodiments the thickness can range from about 0.0254 mm (0.001 inch) to about 0.05 mm (0.002 inch). The composition and thickness of the pressure release vent mechanism 36 can be determined by those of ordinary skill in the art, in view of the vapor transmission rate (VTR) and predetermined release pressure requirements.

The pressure release foil-type vent member can include at least one layer of a composition containing metal, polymer, and mixtures thereof. A suitable three-layer laminate that can be used for the pressure release vent member is PET/aluminum/EAA copolymer available as LIQUIFLEX® Grade 05396 35C-501C from Curwood of Oshkosh, Wis., USA. A suitable four layer material of oriented PP/PE/aluminum/LDPE is FR-2175 from Ludlow Coated Products of Columbus, Ga., USA, which is a wholly-owned subsidiary of Tyco International, Ltd. of Princeton, N.J., USA. A suitable five-layer laminate is PET/PE/Aluminum/PE/LL-DPE available as BF-48 also from Ludlow Coated Products of Columbus, Ga., USA. However, as noted above, any combination of laminates for polypropylene, polyethylene, non-metallized polymeric films coated with a layer of oxidized material that prevents vapor transmission (for example, $SiO_x$ or $Al_2O_x$) and/or aluminum-based foils are also specifically contemplated.

A coined vent 37 may also be used, as shown in FIG. 5. Such vents include at least one layer of a composition of a metal, polymer or mixture thereof, as described hereinabove for the foil-type vent, wherein the coined vent member includes a thin rupturable area or cut-out 37 that allows the vent member to rupture when the predetermined internal pressure of a cell is reached.

Figure 4:
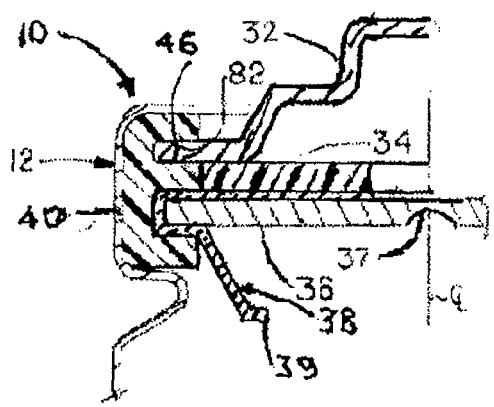
FIG. 4 is a cross-sectional view of one embodiment of the invention illustrating a closure assembly with a coin vent mechanism and a gasket having multiple axial compression zones.

A coined vent 37 may also be used, as shown in FIG. 4. Such vents include at least one layer of a composition of a metal, polymer or mixture thereof, as described hereinabove for the foil-type vent, wherein the coined vent member includes a thin rupturable area or cut-out 37 that allows the vent member to rupture when the predetermined internal pressure of a cell is reached.

Figure 6:
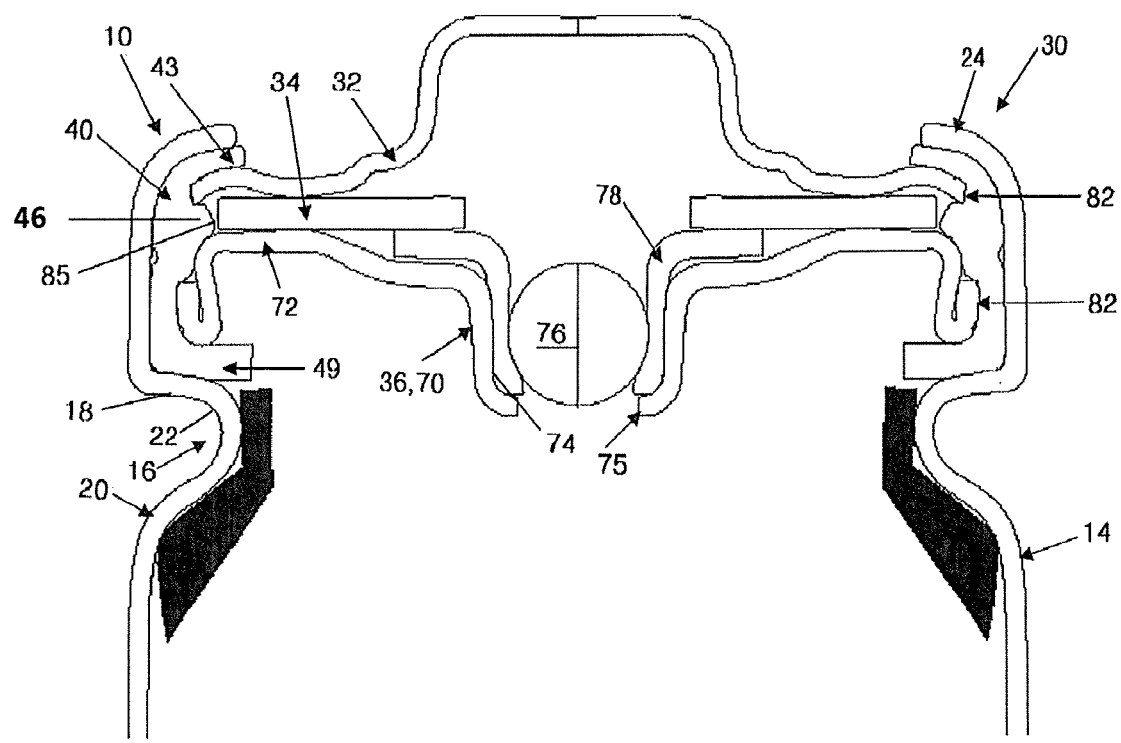
FIG. 6 is a cross-sectional view of a further embodiment of FIG. 1.
Figure 7:
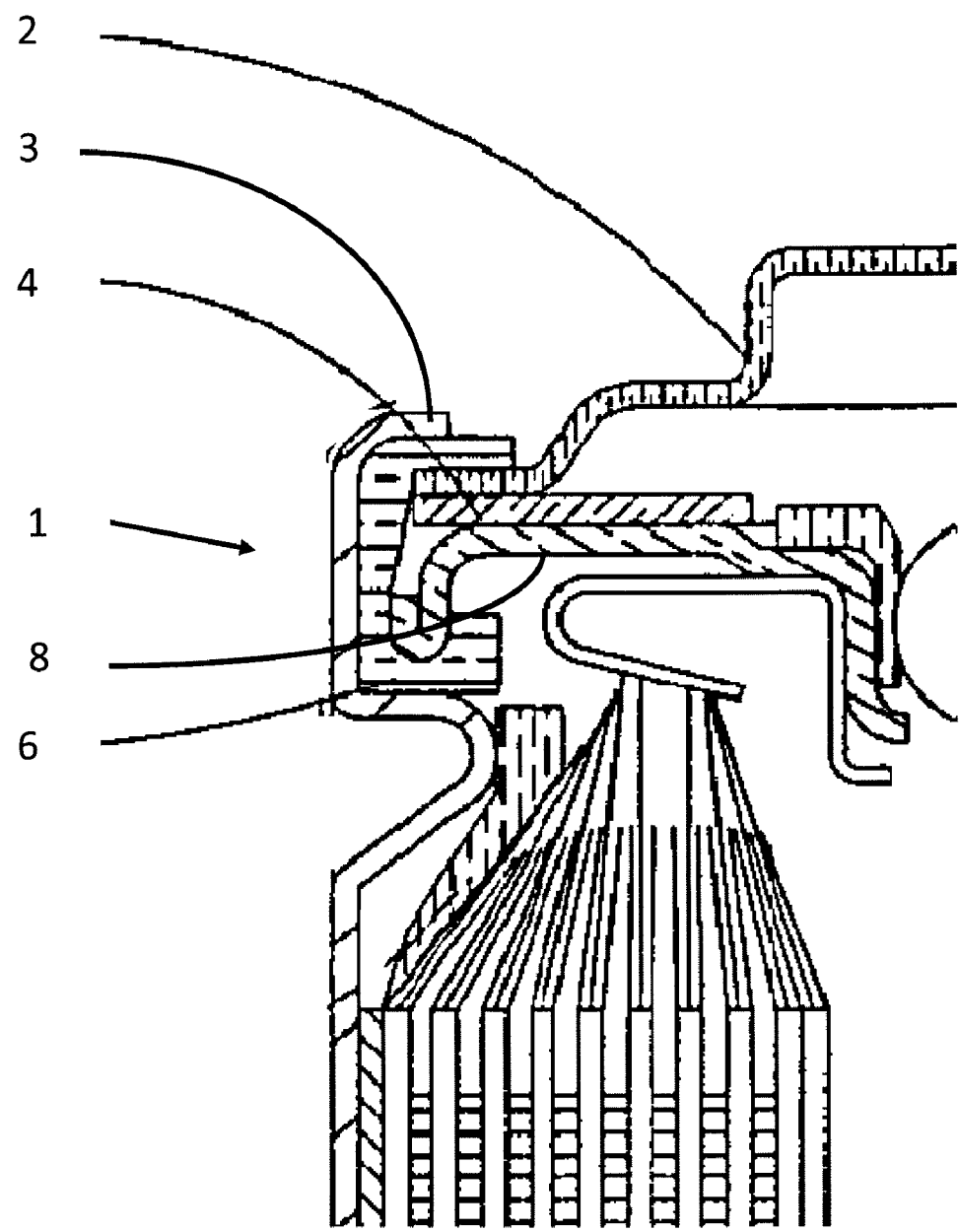
FIG. 7 is a cross-sectional view of a prior art embodiment.

FIG. 6 illustrates a partial cross-sectional view of a further embodiment of an electrochemical cell 10 of the present invention including a PTC device 34 located laterally inward from annular protrusion 46 of seal member 40, wherein the protrusion 46 is not a part of un-deformed shape of the seal member 40 and it is formed by pushing inward a step at outer diameter of the seal member 40. An upper surface of protrusion 46 forms the lower surface or seat 45 (missing in the drawing) of upper cavity 82 in which a peripheral portion of the terminal cover 32 is located. The lower surface of protrusion 46 forms an upper wall of the lower cavity 82 in which a peripheral portion of inner cover 72 (shown here as a rollback cover, although the use of retainer or differently shaped cover may be possible) of vent member 36 is located. As illustrated, the projection engages both the terminal cover 32 and the inner cover 72 of vent member 36. The PTC device 34 is located laterally inward of the axial stack of components of the end assembly 30 including crimped end 24 of container 14, upper flange 43 of seal member 40, terminal cover 32, seal member projection 84, inner cover 72 of vent member 36, lower flange 49 and upper wall 18 of bead 16. Cooperation between the indicated components of the end assembly 30 provides the cell 10 with a desirable seal to minimize electrolyte leakage from and ingress of water into the cell 10. The inner end of PTC device 34 has a bottom surface that rests upon the vent bushing 78 of vent member 36. In the event a foil vent is substituted, the PTC device 34 would instead rest partially or completely the contact member 38 and/or the vent itself (but providing adequate clearance for the vent to rupture).

In order to avoid the primary axial compression forces present in PTC device 34 of the end assembly 30 of the cell 10, the PTC device 34 is located laterally inward of the protrusion 46 of the seal member 40, whereby a portion of the projection 84 is subjected to the primary axial compression forces. The PTC device 34 can either be in contact with the protrusion such as illustrated in FIGS. 1 to 5 or with minimal contact with protrusion 46 as illustrated in FIG. 6. A peripheral portion of terminal cover 32 that contacts the PTC device 34 has a curved shape that functions like a spring that limits the force applied on the PTC device 34.

Each cavity 82 can have a radius that is substantially constant, such as illustrated in FIG. 1 or variable in one or more sections along its axial length, as illustrated in FIG. 6. In each case however, the minimum diameter of each cavity in the deformed or final state is still greater than the diameter the protrusion 46. Therefore, the teachings of the invention regarding placement of the PTC device 34 can be adapted to various electrochemical cell constructions.

In one embodiment, a preformed seal assembly is produced by insert molding a seal member 40 about the periphery of the vent member 36, optionally, the contact member 38 such as shown in FIGS. 1-4, and optionally the retainer 88, such as shown in FIG. 5. A benefit of insert molding at least the vent member 36 within the seal member is that it is not necessary to deform the seal member during cell assembly in order to place the vent member 36 or a subassembly such as the vent member 36 and contact member 38, or the vent member 36, contact member 38 and the retainer 88 within the vent member cavity 82. A further advantage of insert molding is that seal members can be formed having relatively deep features on the inner surface of the seal member. A typical insert molding method such as rotary or stack molding can be utilized, although other methods are also available.

During molding of the seal member, at least the vent member and, optionally, the periphery of the contact member and/or retainer, are encapsulated by a portion of the seal member that is formed around the periphery of the vent member and optionally the contact member. During the insert molding process, the insert (in this case, at least the preformed vent member and the optional the contact member(s) and/or retainer) are placed in the mold prior to introduction of the molding material utilized to form the seal member. A portion of the seal member is then molded around the inserted part, such as the vent member and/or vent member composite including the contact member. The resulting product is the preformed seal assembly comprising the seal member/vent member composite comprising the combined seal member and vent member, and optionally the contact member or the contact member and the retainer. In this arrangement, the insert must be able to withstand the mold and melt temperatures required to properly mold the plastic gasket.

The negative electrode 62 comprises a strip of electrochemically active material. In a preferred embodiment, lithium metal, sometimes referred to as lithium foil, is used. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA. Additional or alternative negative electrode materials are possible, including virtually any intercalable lithium-containing compositions, which are typically coated onto a current collector a manner similar to the processes described with respect to the cathode material below.

The negative electrode may have a non-consumable current collector in some embodiments, within or on the surface of the metallic lithium. When the negative electrode includes a non-consumable current collector, it may be made of copper, nickel or other conductive metals or alloys, so long as they are stable inside the cell.

The negative electrode may be free of a separate current collector, such that only the foil serves as a current collector. This is feasible in lithium and lithium alloys due to their relatively high conductivity alloy. By not utilizing a current collector, more space is available within the container for other components, such as active materials. Providing a cell without a negative electrode current collector can also reduce cell cost.

An electrical lead preferably connects the anode or negative electrode to the cell container. This may be accomplished embedding an end of the lead within a portion of the negative electrode or by simply pressing a portion such as an end of the lead onto the surface of the lithium foil. The lithium or lithium alloy has adhesive properties and generally at least a slight, sufficient pressure or contact between the lead and electrode will weld the components together. In one preferred embodiment, the negative electrode is provided with a lead prior to winding into a jelly-roll configuration. For example, during production, a band comprising at least one negative electrode consisting of a lithium or lithium alloy is provided at a lead connecting station whereat a lead is welded onto the surface of the electrode at a desired location. The tabbed electrode is subsequently processed so that the lead is coined, if desired, in order to shape the free end of the lead not connected to the electrode. Subsequently, the negative electrode is combined with the remaining desired components of the electrode assembly, such as the positive electrode and separator, and wound into a jelly-roll configuration. Preferably after the winding operation has been performed, the free negative electrode lead end is further processed, by bending into a desired configuration prior to insertion into the cell container.

The electrically conductive negative electrode lead has a sufficiently low resistance in order to allow sufficient transfer of electrical current through the lead and have minimal or no impact on service life of the cell. The desired resistance can be achieved by increasing the width and the thickness of the tab.

The positive electrode 64 is generally in the form of a strip that comprises a current collector and a mixture that includes one or more electrochemically active materials, usually in particulate form. Iron disulfide ($FeS_2$) is a preferred active material for primary battery applications. The positive electrode may contain one or more additional active materials, depending on the desired cell electrical and discharge characteristics. Such positive electrode material include $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$ and S. More preferably, the active material for a Li/$FeS_2$ cell positive electrode comprises at least 95 weight percent $FeS_2$ coated onto a metal foil current collector. $FeS_2$ having a purity level of at least 95 weight percent is available from Chemetall GmbH, Vienna, Austria; Washington Mills, North Grafton, Mass., USA; and Kyanite Mining Corp., Dillwyn, Va., USA. Alternatively, any number of materials compatible with secondary systems may also be used.

Typically, the positive and/or negative electrode mixtures may contain other materials. A binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as the electrical conductivity of the active material and binder, the thickness of the mixture on the current collector and the current collector design. Small amounts of various additives may also be used to enhance positive electrode manufacturing and cell performance. A preferred cathode formulations for $LiFeS_2$ cells can be found in U.S. patent application Ser. No. 12/253,516, filed on Oct. 12, 2008, and U.S. Pat. No. 6,849,360, both of which are incorporated by reference herein.

The current collector may be disposed within or imbedded into the positive electrode surface, or the positive electrode mixture may be coated onto one or both sides of a thin metal strip. Aluminum is a commonly used material. The current collector may extend beyond the portion of the positive electrode containing the positive electrode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

A preferred method of making positive electrodes is to roll coat a slurry of active material mixture materials in a solvent (e.g., trichloroethylene) onto both sides of a sheet of aluminum foil, dry the coating to remove the solvent, calender the coated foil to compact the coating, slit the coated foil to the desired width and cut strips of the slit positive electrode material to the desired length. It is desirable to use positive electrode materials with small particle sizes to minimize the risk of puncturing the separator.

The separator 66 is a thin microporous membrane that is ion-permeable and electrically nonconductive. It is capable of holding at least some electrolyte within the pores of the separator. The separator is disposed between adjacent surfaces of the negative electrode and positive electrode to electrically insulate the electrodes from each other. Portions of the separator may also insulate other components in electrical contact with the cell terminals to prevent internal short circuits. Edges of the separator often extend beyond the edges of at least one electrode to insure that the negative electrode and positive electrode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-$cm^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 µm thick, and more preferably no more than 22 µm thick, such as 20 µm or 16 µm. A high tensile stress is desirable, preferably at least 800, more preferably at least 1000 kilograms of force per square centimeter (kgf/$cm^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 µm to 0.40 µm, more preferably no greater than 0.20 µm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in United States Patent Publication No. 20050112462, which is also hereby incorporated by reference.

Separator membranes for use in lithium primary and secondary batteries are often polymeric separators made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness.

The negative electrode, positive electrode and separator strips are combined together in an electrode assembly. The electrode assembly may be a spirally wound design, such as that shown in FIG. 1, made by winding alternating strips of positive electrode, separator, negative electrode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The negative electrode can be the outermost electrode, as shown in FIG. 1, or the positive electrode can be the outermost electrode. Either electrode can be in electrical contact with the cell container, but internal short circuits between the outmost electrode and the side wall of the container can be avoided when the outermost electrode is the same electrode that is intended to be in electrical contact with the can.

In one or more embodiments of the present invention, the electrode assembly is formed with the positive electrode having electrochemically active material selectively deposited thereon for improved service and more efficient utilization of the electrochemically active material of the negative electrode. Non-limiting examples of selectively deposited configurations of electrochemically active material on the positive electrode and further, an electrochemical cell, including a positive container, are set forth in United States Patent Publication Nos. 20080026288 and 20080026293, both fully herein incorporated by reference.

Rather than being spirally wound, the electrode assembly may be formed by folding the electrode and separator strips together. The strips may be aligned along their lengths and then folded in an accordion fashion, or the negative electrode and one electrode strip may be laid perpendicular to the positive electrode and another electrode strip and the electrodes alternately folded one across the other (orthogonally oriented), in both cases forming a stack of alternating negative electrode and positive electrode layers.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the negative electrode is adjacent the majority of the total area of the major surfaces of the positive electrode through the separator, and the outermost portions of the electrode major surfaces are adjacent to the side wall of the container. In this way, expansion of the electrode assembly due to an increase in the combined thicknesses of the negative electrode and positive electrode is constrained by the container side wall(s).

A nonaqueous electrolyte, containing water only in very small quantities as a contaminant (e.g., no more than about 500 parts per million by weight, depending on the electrolyte salt being used), is used in the preferred electrochemical cells of the invention. Any electrolyte suitable may be used, including alkaline solutions, nonaqueous organics and solid-state polymer electrolytes. In the event an organic solvent or solvents are used, examples of suitable salts include lithium bromide, lithium perchlorate, lithium hexafluorophosphate, potassium hexafluorophosphate, lithium hexafluoroarsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in Li/FeS$_2$ cells because the ethers are more stable than with MnO$_2$ positive electrodes, so higher ether levels can be used. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone.

Methods for assembly of the electrochemical cells of the present invention include inserting the electrode assembly and preferably an insulating member such as a cone into the cell container. An initial bead is formed in the sidewall of container. The bead is formed in one embodiment by pressing a forming wheel against the sidewall of the container in the area it is desired to form the bead while the can is rotated around its axis. Electrolyte is dispensed into the container prior to insertion of the end assembly into container, when a foil vent is utilized. Alternatively, if a ball vent is utilized in end assembly, the electrolyte can be added prior to internal sealing of the cell with the ball of the ball vent. The peripheral portions of the end assembly, which may be held together by interference fit, are seated on the upper wall of the initial bead formed. Cell closing operations may include reducing the diameter of the upper sidewall by a redraw or collet process. After diameter reduction, the upper end of the container is also folded inwardly to form a crimped end and axial forces are applied between the bead and crimped end. Radial compression is preferably maintained on at least the upper sidewall during crimping of the upper end of the container.

The results of some embodiments of the cell forming and closing processes are illustrated in the drawings, although other processes consistent with other embodiments of this invention are possible. The shape of the parts and the closing processes should insure that the desired interfaces between the seal member and the container; seal member and the PTC device; and the seal member and the vent member outer diameter are all established and maintained throughout the useful life of the battery.

The above description is particularly relevant to cylindrical Li/FeS$_2$ cells, such as FR6 and FR03 types (as defined in International Standards IEC 60086-1 and IEC 60086-2, published by the International Electrotechnical Commission, Geneva, Switzerland). However, other embodiments can be adapted to other cell sizes, shapes and chemistries. For example, other electrode assembly shapes, housing structures, end assemblies, pressure relief vents, closing processes and the like can be implemented in combination with a dual wall gasket. Other cell chemistries can include primary or rechargeable cylindrical cells with nominal voltages of 1.5 or more, such as Li/SO$_2$, Li/AgCl, Li/V$_2$O$_5$, Li/MnO$_2$, Li/Bi$_2$O$_3$, various lithium composites common to "lithium-ion" systems, nickel metal hydride, alkaline-based and other similar chemistries can be utilized.

The electrode assembly configuration can also vary. For example, it can have spirally wound electrodes, as described above, folded electrodes, or stacks of strips (e.g., flat plates). Also, while the embodiments above describe the use of a single PTC, any number of PTCs may be accommodated according to this invention.

In view of the foregoing, an electrochemical cell comprising any combination of the following features is contemplated:

- a cylindrical container having a closed bottom end, a sidewall and an open end;
- an electrode assembly and an electrolyte disposed within the container;
- an end assembly positioned within the open end, said end assembly having a vent assembly, a cover and a PTC device;
- an annular gasket disposed between the container and the end assembly, said gasket having a radial protrusion formed along at least a portion of an inner circumference of the gasket;
- wherein a portion of the cover and a portion of the vent assembly form a compressive seal with the gasket on opposite sides of the radial protrusion;
- wherein the radial protrusion has an axial height that is at least equal to an axial height of the PTC device and wherein the radial protrusion fits concentrically around the PTC device;
- wherein a terminal edge of the open end of the container is crimped over the gasket;
- wherein the gasket has an E-shape or an F-shape;
- wherein the axial height of the protrusion is greater than the axial height of the PTC device
- wherein the radial protrusion extends continuously along all of an inner diameter of the gasket;
- wherein the vent assembly includes a rollback cover;
- wherein the seal between the gasket and the rollback cover exerts radial and axial compressive forces;
- wherein the radial protrusion includes an annular groove;
- wherein the annular groove receives a portion of the cover or a portion of the vent assembly;
- wherein the vent assembly includes a retainer, said retainer receiving a contact member and a foil vent;
- wherein the retainer maintains electric contact between the contact member and the PTC device;
- wherein the container includes an annular bead proximate to the open end;
- wherein the annular bead and crimped terminal edge create primary axial compression and wherein the PTC device is not exposed to the primary axial compression; and/or
- wherein the gasket is insert molded around the vent assembly.

An electrochemical cell comprising one or more of the following features is also contemplated:

- a cylindrical container having a closed bottom end, a beaded sidewall and an open end;
- an electrode assembly and an electrolyte disposed within the container;
- an end assembly positioned within the open end, said end assembly having a vent assembly, a cover and a PTC device;
- an annular gasket disposed between the container and the end assembly, said gasket having an inward radial protrusion having a smaller inner diameter than portions of the gasket immediately above and below the protrusion;
- wherein the open end of the container is crimped over the gasket and cover to create a primary axial compression force;
- wherein the radial protrusion engages the PTC device to prevent the PTC device from being exposed to the primary axial compression force;
- wherein the end assembly further comprises a retainer, said retainer receiving a portion of the vent assembly and a portion the contact member;
- wherein the contact member is a spring; and/or
- wherein the radial protrusion extends continuously along all of an inner diameter of the gasket.

Finally, a method for sealing a cylindrical electrochemical cell distinguished by any combination of the following steps is contemplated:

- providing a cylindrical container having an open end;
- disposing an electrode assembly and an electrolyte inside of the container;
- forming an annular bead in the open end of the container;
- disposing a vent assembly having a PTC device and a cover concentrically within the gasket having a radial inward protrusion disposed along a sidewall of the gasket, said vent assembly and cover compressively contacting the sidewall of the gasket on opposing sides of the radial protrusion;
- seating an annular gasket in the open end of the container proximate to the annular bead;
- crimping the open end of the container over a portion the flange so that: (i) the annular bead, the gasket and the cover all cooperate to create a primary axial compression force and (ii) the radial protrusion cooperates with the PTC device to prevent primary axial compression force from being exerted on the PTC device;
- wherein the cover is disposed to create radial compression force on an inner sidewall of the cylindrical container above the radial protrusion;

wherein the vent assembly is disposed to create radial compression force on the gasket and an inner sidewall of the cylindrical container;

wherein the radial compression force is exerted below the radial protrusion by a rollback cover provided within the vent assembly; and/or wherein the vent assembly is disposed within the gasket by insert molding the gasket around the vent assembly.

It will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

What is claimed is:

1. An electrochemical cell, comprising: a cylindrical container having a closed bottom end, a sidewall and an open end; an electrode assembly and an electrolyte disposed within the container; an end assembly positioned within the open end, said end assembly having a vent assembly, a cover and a PTC device; an annular gasket concentrically disposed between the container and the end assembly, said gasket having a radial protrusion that is: i) formed along at least a portion of an inner circumference of the gasket, ii) extended radially inward along a radial plane and iii) defined by an innermost diameter along a middle portion of the gasket intersecting the radial plane; wherein the innermost diameter is smaller than an outer diameter formed when a terminal edge of the open end of the container is crimped radially inward over the gasket; wherein a portion of the cover and a portion of the vent assembly form a compressive seal with the gasket on opposite sides of the radial protrusion; and wherein the radial protrusion has an axial height that is at least equal to an axial height of the PTC device; and wherein the PTC has a diameter that is less than or equal to the innermost diameter and is aligned proximate to the radial protrusion in the radial plane so that the radial protrusion fits around the PTC device.

2. The electrochemical cell of claim 1, wherein the gasket has an E-shape or an F-shape after the terminal edge is crimped.

3. The electrochemical cell of claim 1, wherein the axial height of the protrusion is greater than the axial height of the PTC device.

4. The electrochemical cell of claim 1, wherein the radial protrusion extends continuously along all of an inner diameter of the gasket.

5. The electrochemical cell of claim 1, wherein the vent assembly includes a rollback cover.

6. The electrochemical cell of claim 5, wherein the seal between the gasket and the rollback cover exerts radial and axial compressive forces.

7. The electrochemical cell of claim 1, wherein the radial protrusion includes an annular groove.

8. The electrochemical cell of claim 7, wherein the annular groove receives a portion of the cover or a portion of the vent assembly.

9. The electrochemical cell of claim 1, wherein the vent assembly includes a retainer, said retainer receiving a contact member and a foil vent.

10. The electrochemical cell of claim 9, wherein the retainer maintains electric contact between the contact member and the PTC device.

11. The electrochemical cell of claim 1, wherein the container includes an annular bead proximate to the open end.

12. The electrochemical cell of claim 11, wherein the gasket has an E-shape or an F-shape after the terminal edge is crimped.

13. The electrochemical cell of claim 11, wherein the annular bead and crimped terminal edge create primary axial compression and wherein the PTC device is not exposed to the primary axial compression.

14. The electrochemical cell of claim 1, wherein the gasket is insert molded around the vent assembly.

15. An electrochemical cell, comprising:
a cylindrical container having a closed bottom end, a beaded sidewall and an open end;
an electrode assembly and an electrolyte disposed within the container;
an end assembly positioned within the open end, said end assembly having a vent assembly, a cover and a PTC device;
an annular gasket disposed between the container and the end assembly, said gasket having an integrally formed inward radial protrusion defining a smaller inner diameter in comparison to portions of the gasket immediately above and below the protrusion;
wherein the open end of the container is crimped over the gasket and the cover to create a primary axial compression force; and
wherein an innermost terminal edge of the radial protrusion abuts an outermost terminal edge of the PTC device to prevent the PTC device from being exposed to the primary axial compression force created by crimping a terminal edge of the container over a portion of the end assembly.

16. The electrochemical cell of claim 15, wherein the end assembly further comprises a retainer, said retainer receiving a portion of the vent assembly and a portion the contact member.

17. The electrochemical cell of claim 15, wherein the contact member is a spring.

18. The electrochemical cell of claim 15, wherein the radial protrusion extends continuously along all of an inner diameter of the gasket.

* * * * *